United States Patent

Rennar et al.

[11] Patent Number: 6,057,044
[45] Date of Patent: *May 2, 2000

[54] COMPOSITE BODY OF A THERMOPLASTIC POLYMER WITH DIRECTLY MOLDED ON RUBBER COPOLYMER FUNCTIONAL ELEMENTS

[75] Inventors: Nikolaus Rennar, Unterpleichfeld; Gerhard Schönefeld, Kürnach; Tanja Schalek, Kronach, all of Germany

[73] Assignee: Hoechst Aktiengesellschaft, Germany

[*] Notice: This patent issued on a continued prosecution application filed under 37 CFR 1.53(d), and is subject to the twenty year patent term provisions of 35 U.S.C. 154(a)(2).

[21] Appl. No.: 08/947,567

[22] Filed: Oct. 9, 1997

[30] Foreign Application Priority Data

Oct. 11, 1996 [DE] Germany .................. 196 41 904

[51] Int. Cl.⁷ .................. B32B 25/12; B32B 25/14; B32B 25/16
[52] U.S. Cl. .................. 428/500; 428/483; 428/492
[58] Field of Search .................. 525/88, 332.6; 524/847; 428/483, 492, 500

[56] References Cited

U.S. PATENT DOCUMENTS

| | | |
|---|---|---|
| 3,476,832 | 11/1969 | Pritchard . |
| 3,642,940 | 2/1972 | Burg et al. . |
| 3,715,332 | 2/1973 | Junkermann et al. .................. 525/935 |
| 3,938,574 | 2/1976 | Burmester et al. .................. 152/330 |
| 4,343,339 | 8/1982 | Schwindt et al. .................. 152/209 |
| 5,098,787 | 3/1992 | Komatsu et al. .................. 428/343 |
| 5,132,182 | 7/1992 | Grosse-Puppendahl et al. ... 428/475.8 |
| 5,256,733 | 10/1993 | Fleischer et al. .................. 525/902 |
| 5,334,647 | 8/1994 | Sperk, Jr. et al. .................. 524/507 |

FOREIGN PATENT DOCUMENTS

| | | |
|---|---|---|
| 0344427 | 12/1989 | European Pat. Off. . |
| 710539 | 5/1996 | European Pat. Off. . |
| 93-100077 | 1/1993 | Germany . |
| 58-171878 | 10/1983 | Japan . |

OTHER PUBLICATIONS

Zhang et al., Journal "Study on properties of NBR/POM . . . ", CA AN:124:204636, 1995.

*Primary Examiner*—Robert E. Sellers
*Attorney, Agent, or Firm*—Connolly Bove Lodge & Hutz

[57] ABSTRACT

A thermoplastic polymer/rubber composite body useful as fittings, couplings, sealing elements, rubber bearings and automotive housings comprises a molding of a thermoplastic polymer such as a polyacetal or polyester wherein a rubber copolymer with a crosslinking agent is molded thereon by injection molding, coinjection or coextrusion followed by the vulcanization of the rubber copolymer.

7 Claims, No Drawings

COMPOSITE BODY OF A THERMOPLASTIC POLYMER WITH DIRECTLY MOLDED ON RUBBER COPOLYMER FUNCTIONAL ELEMENTS

The invention relates to thermoplastic/rubber composite bodies, preferably of a combination of the industrial material polyacetal, in particular polyoxymethylene, with directly molded-on functional elements of one or more crosslinked rubbers (elastomers).

The industrial material polyacetal, in particular polyoxymethylene (POM), has excellent mechanical properties and is furthermore also resistant to all the usual solvents and fuels. Moldings of polyoxymethylene are therefore often used in fuel-carrying systems. Because of the very good resistance to chemicals, housings are also produced from polyoxymethylene. However, POM has a low mechanical damping factor at room temperature, which in some applications necessitates the use of flexible damping elements. Furthermore, when installing moldings of polyoxymethylene, a seal is often necessary at the connecting points. The high surface hardness of moldings of POM and the low coefficient of sliding friction of POM can lead to objects lying on top slipping and limit the operating reliability of switching elements and operating elements of POM.

Previously, seals and damping elements have either been provided separately and usually anchored mechanically in an additional working step, which causes additional work and in some cases considerable additional costs.

Moldings of polyacetal with directly molded-on functional elements which have been produced using non-crosslinked rubbers are also known (DE-C 44 39 766). However, the adhesive strength of such composite bodies is not yet satisfactory.

The object of the present invention was to provide a composite body of polymers with directly molded-on functional elements in which the disadvantages mentioned do not exist.

This object is achieved by a thermoplastic/rubber composite body comprising
 a) at least one thermoplastic polymer,
 b) at least one rubber copolymer,
 c) at least one reinforcing filler,
 d) at least one crosslinking agent and
 e) if appropriate further customary additives.

To increase the adhesion of the rubber component to the thermoplastic, the composite body can furthermore comprise
 f) at least one phenolic resin and/or the phenol and aldehyde starting components thereof.

The invention also relates to a process for the production of the abovementioned thermoplastic/rubber composite body which comprises the following steps:
 A) mixing of at least one component b) with component c), and if appropriate further customary additives and component f), in the absence of crosslinking constituents, while heating at a temperature of 105 to 150° C.,
 B) admixing of component d) at a temperature below 100° C.,
 C) joining of the resulting mixture from steps A) and B) with an initially introduced thermoplastic component at 130 to 170° C. by injection molding-on, or coinjection and
 D) vulcanizing the rubber copolymer to form the thermoplastic/rubber composite body in a die mold at 140 to 180° C.

A suitable thermoplastic (component a) which is used in the composite body is, polyester, and above all, polyacetal, and in particular the known polyoxymethylene (POM) such as are described, for example, in DE-A 29 47 490. These are in general unbranched linear polymers, which as a rule contain at least 80%, preferably at least 90%, of oxymethylene units ($—CH_2O—$). The term polyoxymethylenes here comprises both homopolymers of formaldehyde or its cyclic oligomers, such as trioxane or tetroxane, and corresponding copolymers.

Homopolymers of formaldehyde or trioxane are those polymers in which the hydroxyl end groups are stabilized chemically against degradation in a known manner, for example by esterification or etherification.

Copolymers are polymers of formaldehyde or its cyclic oligomers, in particular trioxane, and cyclic ethers, cyclic acetals and/or linear polyacetals.

Possible comonomers are 1) cyclic ethers having 3, 4 or 5, preferably 3 ring members, 2) cyclic acetals other than trioxane having 5 to 11, preferably 5, 6, 7 or 8 ring members, and 3) linear polyacetals, in each case in amounts of 0.1 to 20, preferably 0.5 to 10 mol %. Copolymers of 99.5–95 mol % of trioxane at 0.5 to 5 mol % of one of the abovementioned co-components are most suitable.

The polyacetal polymers employed in general have a melt flow index (MFR value 190/2.16) of 2 to 50 g/10 minutes (DIN 53735).

Polyesters, for example, preferably polybutylene terephthalate, are also suitable.

The rubber copolymer (component b) comprises a conjugated diene and a monoolefinic monomer. The dienes used are buta-(1,3)-diene, isoprene, 2,3-dimethylbuta-1,3-diene or mixtures thereof. Acrylonitrile and/or methacrylonitrile is preferably employed as the monoolefinic monomer. Acrylonitrile/butadiene copolymer has proved to be particularly suitable.

It was surprising that the rubbers mentioned, in crosslinked form, have a considerably better adhesive strength on the thermoplastic of the composite body than the rubbers known from the prior art.

The reinforcing filler (component c) is finely divided precipitated silicic acid having a BET area of 40 to 350 $m^2/g$, a CTAB area of 50 to 350 $m^2/g$, an average particle diameter of 50 to 150 nm and a DBP number of 50 to 350 $cm^3/100$ g, or a mixture of this silicic acid with carbon black which has an iodine absorption number (ASTM-D 1510) of 10 to 270 g/kg, a CTAB area (ASTM-D 3765) of 5 to 250 $m^2/g$ and a DBP number (ASTM-D 2414) of 40 to 180 $cm^3/100$ g. Component c) is present in an amount of 20 to 80 parts by weight, preferably 30 to 60 parts by weight, per 100 parts of component b).

A suitable crosslinking agent for the rubber copolymer b) has proved to be a mixture of d1) sulfur or a combination of sulfur and a sulfur donor with d2) a combination of d2-1) at least one sulfenamide accelerator and d2-2) at least one dithiocarbamate accelerator, if appropriate also d2-3) at least one guanidine and/or mercapto accelerator being present. The sulfenamide accelerator employed is preferably N-cyclohexyl-, N-tert-butyl- or, N,N-dicyclohexyl-2-benzothiazolylsulfenamide or mixtures thereof, the dithiocarbamate accelerator employed is preferably zinc dibenzyldithiocarbamate, the guanidine accelerator employed is preferably N,N'-diphenyl-, or di-o-tolylguanidine or o-tolylbiguanide or mixtures thereof, and the mercapto accelerator employed is preferably 2-mercaptobenzothiazole.

The amounts of the individual constituents of component d) in the combination employed are:

Sulfur: 0.2 to 1.5 parts by weight, preferably 0.4 to 0.7 parts by weight,

Sulfur donor: 0.2 to 2.5 parts by weight, preferably 0.5 to 1.5 parts by weight, Sulfenamide: 0.2 to 2.5 parts by weight, preferably 0.5 to 1.5 parts by weight, Dithiocarbamate: 0.2 to 3.0 parts by weight, preferably 1.5 to 2.5 parts by weight, Guanidine: 0 to 1.0 part by weight, preferably 0.2 to 0.4 part by weight, Mercapto: 0 to 2.0 parts by weight, preferably 0.6 to 1.5 parts by weight, based on the sum of components b) to d).

Sulfur donors are in general organic compounds which contain the sulfur in a thermally labile form, for example dithio-bis-caprolactam.

If a sulfur donor is used, the proportion of sulfur employed is reduced accordingly.

The accelerators have been chosen from the point of view that the formation of secondary amines during the vulcanization operation is largely avoided. Under no circumstances do carcinogenic nitrosoamines occur.

Customary additives in the context of the present invention are anti-ageing agents, light stabilizers, stearic acid, zinc oxide, plasticizers, processing auxiliaries, for example colophony and flameproofing agents.

Anti-ageing agents which can be employed are N-isopropyl- and N-(1,3-dimethylbutyl)-N'-phenyl-p-phenylenediamine. Plasticizers are known, commercially available products, preferably methylene-bis-thioglycolic acid butyl ester. Stearic acid and zinc oxide serve as activators during the vulcanization. The additives of component e) are present in customary amounts.

Phenol-formaldehyde resins can be employed as component f). However, it is advantageous to use a phenol compound and a formaldehyde donor in order to achieve the formation of the phenolic resin in situ during the mixing and vulcanization process. Resorcinol has proved favorable as the phenol compound and hexamethylenediamine as the formaldehyde donor. Component f) is added to mixtures b) to e) in an amount of 0.5 to 10 parts by weight, preferably 3 to 6 parts by weight, per 100 parts by weight of component b).

In the process according to the present invention, a base mixture is first prepared in stage A). This is preferably carried out using an internal mixer or plunger kneader with intermeshing rotors, the mixing tools being equipped with or without a rotor gap adjustment.

It has proved favorable to initially introduce the rubber copolymer at the start of the mixing operation and then to add the reinforcing filler and, if appropriate, the phenol starting component of component f), and subsequently the plasticizer, anti-ageing agent, light stabilizer, stearic acid, zinc oxide and the formaldehyde donor. By staggered edition of the two starting components of component f), premature formation of resin is counteracted.

In the subsequent stage B), for example, the crosslinking agent component d) is added on a roll mill at temperatures of 40 to 90° C. A rolled hide is formed by this procedure, and can be fed to stage C). It is also possible to cool this hide, for example with liquid nitrogen, and to comminute the resulting brittle goods to granules, which can then be stored under refrigeration and put to use later. The mixing operation of stage b) can of course also be carried out on other commercially available mixing units.

In step C), a molding of a thermoplastic polymer according to the invention is taken and combined with the amount of mixture from steps a) and b) required for the desired article at 130 to 170° C., preferably 140 to 150° C., by injection molding-on, coextrusion or coinjection by known processes.

In step D), the vulcanizable content of the resulting composite molding is then vulcanized in a die mold at 140 to 180° C., preferably 150 to 165° C., a firmly adhering join resulting between the two main components—the thermoplastic polymer and the crosslinked rubber.

Functional elements in the context of the present invention are to be understood as meaning, for example, sealing and/or damping elements, or also regions for improving sliding properties, such as recessed bricks and the like.

The expression "directly molded on" in the context of the present invention is to be understood as meaning that the functional elements have preferably been produced together with the moldings of the thermoplastic polymer, with which they are to undergo an adhesive join, preferably in a one-stage process, for example in a multicomponent injection molding process or by coextrusion.

By using the abovementioned elastomers, the sealing or damping elements can be molded directly onto moldings of thermoplastic polymers without further assembly steps being necessary. By omitting the processing steps previously required for assembly of functional elements, a considerable saving in costs can be achieved during production of the moldings according to the invention and assembly thereof.

Fields of use for the moldings according to the invention are, for example, fittings, couplings, sealing elements, rubber bearings, housings in automobile construction, such as door lock housings, window winder housings, sunroof sealing elements and the like, as well as fixing elements with good damping properties, for example clips or nonskid operating elements, such as buttons or recessed grips on writing implements or switch levers.

Since there was no measurement method for the adhesive strength between the components of thermoplastic polymer and rubber of the composite body according to the invention, a suitable measurement method has been developed.

To produce the test specimens required for this, longitudinal holes having the dimensions 120×15 mm were milled out of a sheet having a thickness of 4 mm. An overflow for the ejection of rubber was attached on one side. This sheet was closed between two flat sheets, after a piece of a thermoplastic polymer having the dimensions 60×15×4 mm had been incorporated in each case into the longitudinal holes flush with the top, and a corresponding amount of rubber of components b) to, if appropriate, f) had been incorporated into the empty volume remaining. This system was introduced into a heating press, a locking force of 157 kN was established and the rubber content was vulcanized at a desired temperature. Test bars having the dimensions 120×15×4 mm, one half comprising the thermoplastic polymer and the other comprising the rubber, were formed, the thermoplastic and rubber being joined to one another at the faces.

These test bars were tested on a tensile tester type 1474 (Zwick, Federal Republic of Germany) in accordance with the method of tensile test bar 5 according to DIN 53455.

The tensile strength $\sigma_B$ (N/mm$^2$) in the standard operating environment was measured. This value was converted into the adhesive strength $\beta_{max}$ (N)/mm$^2$). The results of the individual specimens are listed in the table.

EXAMPLES

The amounts are in parts by weight.

In accordance with the process described, the components listed in Table 1 are mixed, processed to a rolled hide and processed to test specimens in accordance with the above specification, together with polyoxymethylene (Hostaform 9021, melt flow index (MFI 190/2,16) 9 g/10 minutes, manufacturer Hoechst AG, Frankfurt a.M., Federal Republic of Germany). The test specimens were tested on a tensile tester type 1474 with a tensile testing rate V=50 mm/minute under the standard operating environment. The results are shown in Table 2.

TABLE 1

| Constituent | Trade name | Example 1 | Example 2 | Example 3 |
|---|---|---|---|---|
| Nitrile rubber | ® Perbunan NT 3945 | 100 | 100 | 100 |
| Carbon black | ® Corax N 550 | 37.5 | 37.5 | 37.5 |
| Precipitated silicic acid | ® Ultrasil VN 2 | 15 | 15 | 15 |
| Synthetic plasticizer | | 5 | 5 | 3.5 |
| Colophony | | — | — | 1.5 |
| Resorcinol/stearic acid mixture | ® Cohedur RS | 3 | 3 | 3 |
| Formaldehyde donor | ® Cohedur A/100 | 2 | 2 | 2 |
| Antiaging agent | | 2 | 2 | 2 |
| Light-stabilizer wax | | 1 | 1 | 1 |
| Stearic acid | | 2 | 2 | 2 |
| Zinc white | | 4 | 4 | 4 |
| Sulfur | | 0.8 | 0.8 | 0.8 |
| Accelerator CBS | ® Vulkacit CZ | 2 | 1 | 1 |
| Accelerator ZBEC | ® Vulkacit ZBEC | 4 | 3 | 3 |

® protected trademark
Perbunan NT 3945, Cohedur RS Cohedur A/100, Vulkacit CZ and Vulkacit ZBEC are products of Bayer AG, Leverkusen, Federal Republic of Germany Corax N 550 and Ultrasil VN2 are products of Degussa AG, Frankfurt a.M.

TABLE 2

| Thermoplastic | POM | POM | POM |
|---|---|---|---|
| Vulcanized product | Example 1 | Example 2 | Example 3 |
| Vulcanization temperature $T_c$/°C. | 150 | 150 | 155 |
| Vulcanization time $t_{90}$/min | 4 | 4.3 | 4.5 |
| Vulcanized product Shore A hardness* | 67 | 65 | 67 |
| Adhesive strength of the composite body $\sigma_{max}$/N/mm$^2$ | 6.3 | 6.7 | 6.3 |

DIN 53505

COMPARISON

The hot adhesive join between two non-pretreated PMO components with an adhesive surface of 3 cm$^2$, joined by means of an adhesive based on NBR-phenolic resin (contact time: 1 hour at 130° C.), withstands a tensile shear strength $T_B \leq 1.77$ N/mm$^2$ (18.0 kp/cm$^2$) after storage at room temperature for three days. (cf. H. Lucke: Kunststoffe und ihre Verklebung, [plastics and their glueing] Verlag Brunke Garrels Hamburg, 1967, pp. 68)

We claim:

1. A thermoplastic/rubber composite body comprising
   a) a molding of at least one thermoplastic polymer selected from the group consisting of polyacetal and polyester,
   b) at least one functional element of at least one rubber copolymer, the rubber copolymer comprising a conjugated diene and a monoolefinic monomer,
   c) at least one reinforcing filler, and
   d) at least one crosslinking agent, and wherein the thermoplastic/rubber composite body is obtained by
      A) mixing the rubber copolymer with the reinforcing filler c) in the absence of crosslinking constituents, while heating at a temperature of 105 to 150° C.,
      B) admixing the crosslinking agent d) at a temperature below 100° C.,
      C) joining the resulting mixture from steps A) and B) with the molding of at least one thermoplastic polymer at 130 to 170° C. by directly molding-on the functional element on the molding of at least one thermoplastic polymer by injection molding, coinjection on coextrusion the resulting mixture of steps A) and B) on the molding, and
      D) vulcanizing the rubber copolymer at 140 to 180° C.

2. A composite body as claimed in claim 1, wherein the conjugated diene is selected from the group comprising buta-(1,3)-diene, isoprene, 2,3-dimethylbuta-(1,3)-diene and mixtures thereof.

3. A composite body as claimed in claim 1, wherein the monoolefinic monomer is selected from the group comprising acrylonitrile, methacrylonitrile and mixtures thereof.

4. A composite body as claimed in claim 1, wherein component c) is finely divided precipitated silicic acid having a BET area of 40 to 350 m$^2$/g, a CTAB area of 50 to 350 m$^2$/g, an average particle diameter of 10 to 150 nm and a DBP number of 50 to 350 cm$^3$/100 g, or a combination of silicic acid with carbon black which has an iodine adsorption number of 10 to 270 g/kg, a CTAB area of 5 to 250 m$^2$/g and a DBP number of 40 to 180 cm$^3$/100 g.

5. A composite body as claimed in claim 1, comprising component c) in an amount of 20 to 80 parts by weight per 100 parts by weight of component b).

6. A composite body as claimed in claim 1, wherein component d) comprises d1) sulfur or a combination with a sulfur donor and d2) a combination of d2-1) at least one sulfenamide accelerator, d2-2) at least one dithiocarbamate accelerator and, optionally, d2-3) at least one guanidine and/or mercapto accelerator.

7. A composite body as claimed in claim 6, wherein N-cyclohexyl-, N-tert-butyl-, or N,N-dicyclohexyl-2-benzothiazolyl-sulfenamide or a mixture thereof is employed as the sulfenamide accelerator; zinc dibenzyldithiocarbamate is employed as the dithiocarbamate accelerator; N,N'-diphenyl-, or di-o-tolylguanidine or o-tolylbiguanide or a mixture thereof is employed as the guanidine accelerator and 2-mercaptobenzothiazole is employed as the mercapto accelerator.

* * * * *

UNITED STATES PATENT AND TRADEMARK OFFICE
CERTIFICATE OF CORRECTION

PATENT NO. : 6,057,044
DATED : May 2, 2000
INVENTOR(S) : Nikolaus Rennar et al

It is certified that error appears in the above-identified patent and that said Letters Patent is hereby corrected as shown below:

Column 6, line 31 (claim 1, line 21), "on coextrusion" should read

-- or coextrusion --.

Signed and Sealed this

Twentieth Day of February, 2001

NICHOLAS P. GODICI

Attest:

Attesting Officer

Acting Director of the United States Patent and Trademark Office